United States Patent
Mao

(10) Patent No.: US 10,069,394 B2
(45) Date of Patent: Sep. 4, 2018

(54) VIBRATION MOTOR

(71) Applicant: Lubin Mao, Shenzhen (CN)

(72) Inventor: Lubin Mao, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 288 days.

(21) Appl. No.: 15/236,647

(22) Filed: Aug. 15, 2016

(65) Prior Publication Data

US 2017/0117790 A1 Apr. 27, 2017

(30) Foreign Application Priority Data

Oct. 23, 2015 (CN) .................... 2015 2 0828197 U

(51) Int. Cl.
| | |
|---|---|
| *H02K 5/22* | (2006.01) |
| *H02K 33/02* | (2006.01) |
| *H02K 1/34* | (2006.01) |
| *H02K 3/04* | (2006.01) |
| *H02K 5/04* | (2006.01) |
| *H02K 33/16* | (2006.01) |
| *H02K 3/47* | (2006.01) |

(52) U.S. Cl.
CPC .............. *H02K 33/02* (2013.01); *H02K 1/34* (2013.01); *H02K 3/04* (2013.01); *H02K 3/47* (2013.01); *H02K 5/04* (2013.01); *H02K 33/16* (2013.01); *H02K 2211/03* (2013.01)

(58) Field of Classification Search
CPC ............ H02K 33/02; H02K 1/34; H02K 5/04; H02K 5/22
See application file for complete search history.

(56) References Cited

U.S. PATENT DOCUMENTS

| | | | |
|---|---|---|---|
| 2011/0018365 A1* | 1/2011 | Kim ................. | B06B 1/045 310/17 |
| 2011/0068639 A1* | 3/2011 | Choi ................. | H02K 33/16 310/25 |
| 2017/0012516 A1* | 1/2017 | Xu ................. | H02K 11/30 |

* cited by examiner

*Primary Examiner* — Dang Le
(74) *Attorney, Agent, or Firm* — Na Xu; IPro, PLLC

(57) ABSTRACT

A vibration motor includes a housing having an accommodation space, a cover plate by which the housing is connected in the covered way, a first vibration system and a second vibration system supported in the accommodation space elastically and arranged oppositely with interval, wherein the first vibration system includes at least one permanent magnet, and the second vibration system comprises at least one coil. The housing has a bottom wall and a side wall extending from the bottom wall, further the housing includes a platform extending from the second side wall to outside of the housing. The vibration motor further includes a flexible circuit board for connecting with the coil electrically. The flexible circuit board includes a conductive terminal adhered to the bottom wall, a welding part adhered to the platform and a connecting part connecting the conductive terminal with the welding part.

9 Claims, 2 Drawing Sheets

VIBRATION MOTOR

FIELD OF THE INVENTION

The present application is related to a motor, especially to a vibration motor applicable for a portable electronic product.

DESCRIPTION OF RELATED ART

The vibration motor is applied to feedback of the system generally, such as incoming call prompt, message prompt and navigation prompt of mobile phone, vibration feedback of game player, etc. for the portable consumer electronic products which are favored by more and more people along with development of the electronic technologies, such as mobile phone, handheld game player, navigation unit or handheld multimedia entertainment equipment, etc. Thus, the vibration motor is required to have excellent performance, long service life and small dimensions as a result of such wide application.

The vibration motor applied to the portable consumer electronic products so far comprises a housing, a base forming an accommodation space with the housing after assembling, and a single vibration system accommodated and fixed in the accommodation space generally. The vibration motor of such a traditional structure has one resonant frequency only because one vibration system has one natural resonant frequency only; and two vibration motors shall be taken if two resonant frequencies are required to carry out on the terminal using this vibration motor; in this way, the space occupied by the vibration motor shall be improved greatly and inevitably, and it is not good for development of the existing terminal in the direction of miniature.

For this reason, it is necessary to provide a new vibration motor to solve the technical problems above.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

The present invention will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

Figure 1:
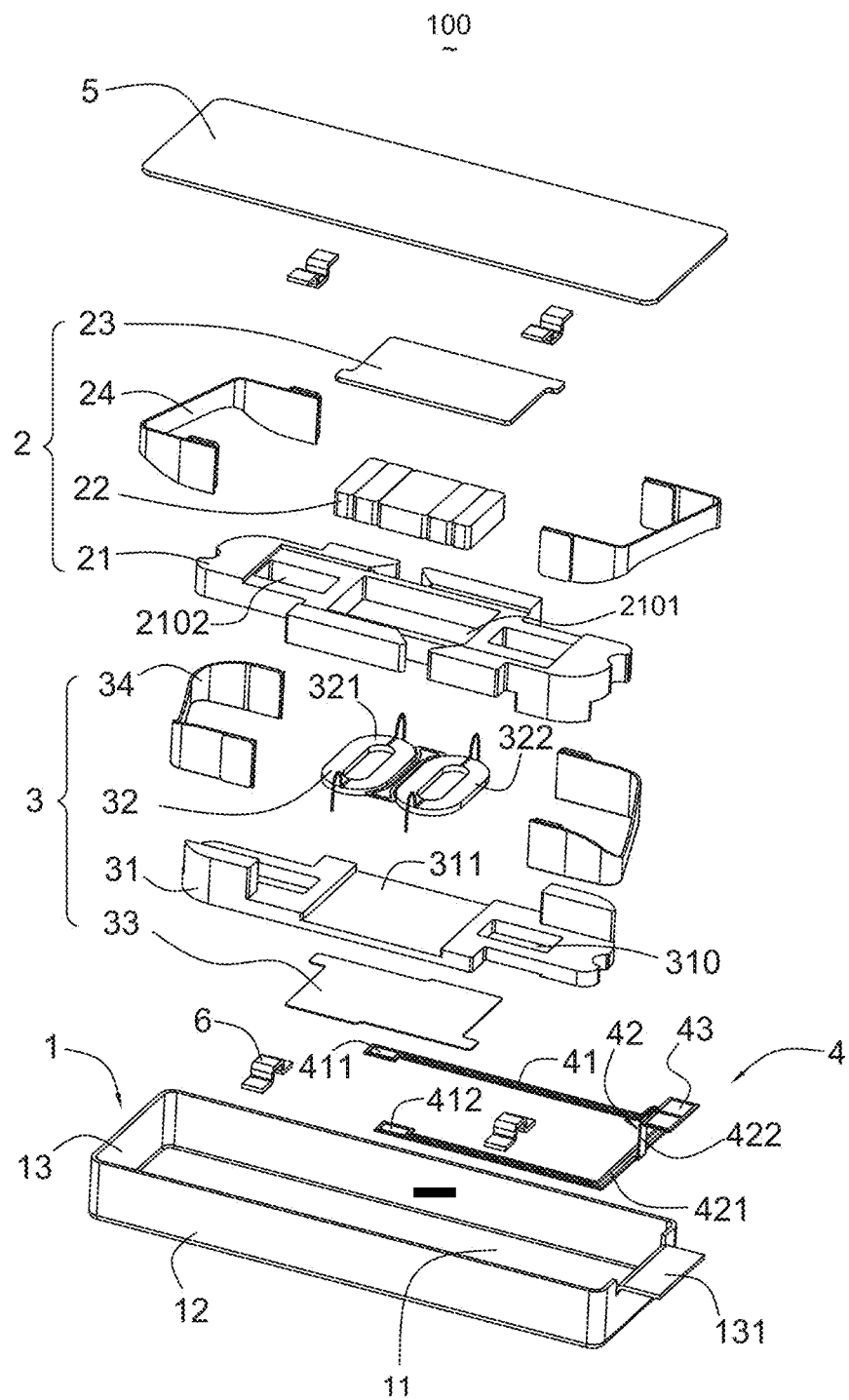
FIG. 1 is an isometric and exploded view of a vibration motor in accordance with an exemplary embodiment of the present disclosure.
Figure 2:
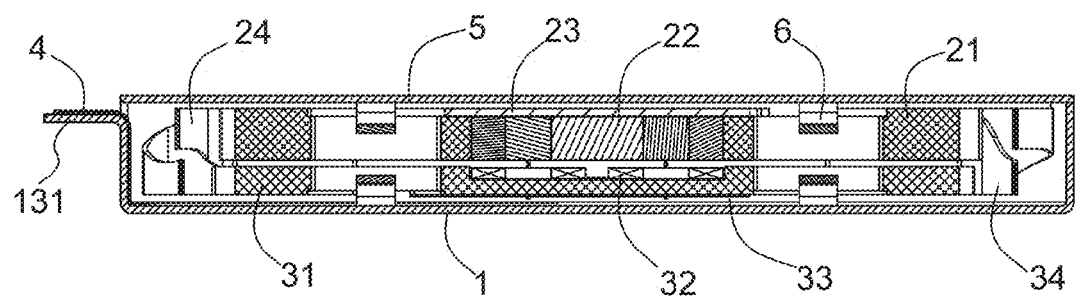
FIG. 2 is a cross-sectional view of the assembled vibration motor in FIG. 1.

A vibration motor 100, as shown in FIGS. 1-2 comprises a housing 1 having an accommodation space, a cover plate 5 connected with the housing 1, a first vibration system 2 accommodated in the accommodation space and including at least one permanent magnet 22, and a second vibration system 3 accommodated in the accommodation space and including at least one coil 32; the coil 32 and the permanent magnet 22 are arranged oppositely with interval, wherein the first vibration system 2 and the second vibration system 3 are driven to vibrate in the housing 1 as a result of interaction between the coil 32 and the permanent magnet 22.

The housing 1 comprises a bottom wall 11 and a side wall extending perpendicularly from the bottom wall 11 thereby forming the accommodation space. The housing comprises two first side walls 12 extending along a vibration direction of the motor and second side walls 13 positioned on two ends of the first side walls 12 and connecting the two first side walls 12 respectively. The side wall is connected by the cover plate 5 in the covered way, thereby forming a protective structure of the vibration motor with the housing 1 jointly.

The vibration motor 100 further comprises one pair of first elastic supports 24 and one pair of second elastic supports 34 for elastically suspending the first and second vibration systems in the accommodation space.

The first vibration system 2 comprises a first weight 21 on which an accommodation hole 2101 for accommodating the permanent magnet 22 is arranged; the accommodation hole 2101 runs through the first weight 21 along the vibration direction of the first vibration system. In this embodiment, the permanent magnet 22 refers to five permanent magnets which are arranged abreast.

The first vibration system 2 also comprises a first pole plate 23 attached to the first weight 21, wherein the first pole plate 23 is attached to the surface of the first weight 21 close to one side of the cover plate; therefore, the permanent magnet 22 can be covered.

The second vibration system 3 comprises a second weight 31 on which an accommodation groove 311 for accommodating the coil 32 is arranged; the accommodation groove 311 is concave along the vibration direction vertical to the first vibration system 2 and the second vibration system. The coil 32 comprises a first coil 321 and a second coil 322 which are arranged abreast along the vibration direction and arranged in the identical accommodation groove 311. The present application is preferably characterized in that the coil 32 refers to the flat and circular coil; and the interaction between the magnetic field generated upon electrification of the coil 32 and the permanent magnet 22 shall be generated.

The second vibration system 3 also comprises a second pole plate 33 adhered to the second weight 31, wherein the second pole plate 33 is adhered to the surface of the second weight close to one side of the bottom wall 11, and the coil 22 is covered by using the projection on one side of the accommodation groove 311 of the second weight 311.

One end of the first elastic support 24 is fixed on the second side wall 13 of the housing 1, and the other end thereof is fixed on the first weight 21; one end of the second elastic support 34 is fixed on the second side wall 13 of the housing 1, and the other end thereof is fixed on the second weight 31; and the first elastic support 24 and the second elastic support 34 are U-shaped springs in the present application; in fact, the shapes of the first elastic support 24 and the second elastic support 34 are not limited to certain specific shape and structure, and can be the V-shaped spring, the helical spring, etc. as long as the first vibration system 2 and the second vibration system 3 are supported elastically, and the first elastic support 24 and the second elastic support 34 are suspended in the accommodation space of the housing 1 and provide the elastic reset forces.

Figure 3:
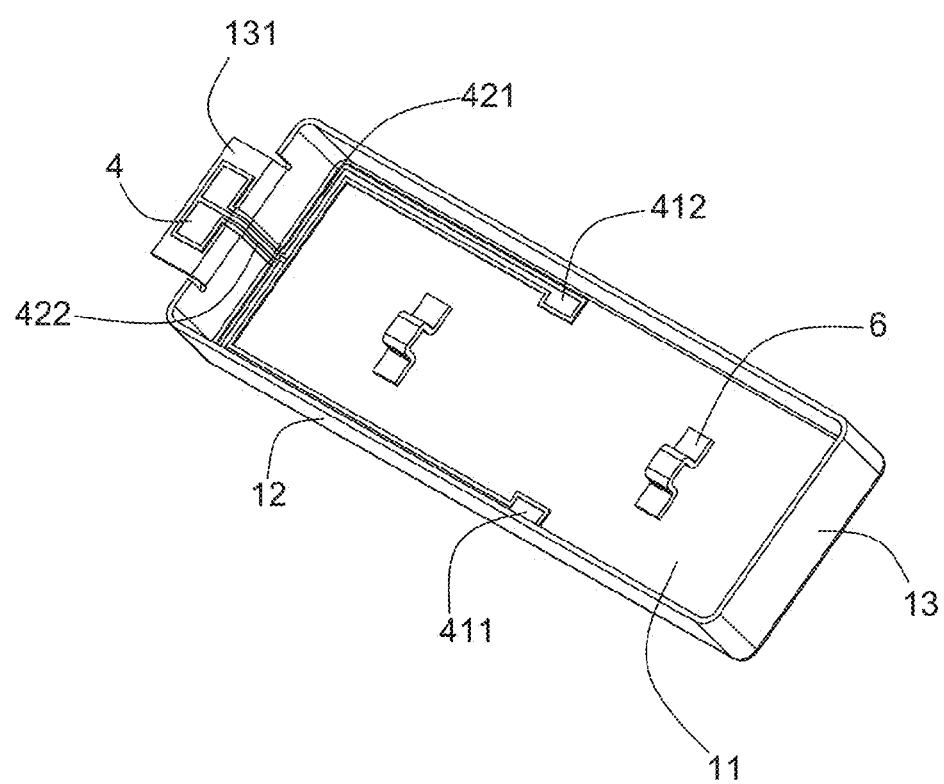
FIG. 3 is an isometric view of the vibration motor, a cover plate thereof being removed.

As shown in FIGS. 2-3, the housing 1 further comprises a platform 131 extending out from the housing 1 from the second side wall 13 in the zigzag form, wherein the platform 131 and the cover plate are arranged with interval, that is, an opening is formed by the housing 1 and the cover plate 5 at the place of the platform. Preferably, the platform 131 is arranged parallel with the inner surface of the cover plate 5.

The vibration motor 100 further comprises a flexible circuit board 6 for connecting with the coil 32 electrically. The flexible circuit board 6 comprises a conductive terminal 41 adhered to the bottom wall, a welding part 43 adhered to the platform and a connecting part connecting the conductive terminal 41 with the welding part. The conductive terminal 41 comprises a first conductive terminal 411 and a second conductive terminal 412 adhered to two sides of the bottom wall respectively; the first conductive terminal 411 is connected with the first coil 321 electrically, and the second conductive terminal 412 is connected with the second coil 322. The coil 32 is connected with the conductive terminal 41 by using a lead of an outgoing coil. Preferably, the first conductive terminal 411 and the second conductive terminal 412 are propped against the two first side walls 12, respectively; therefore, the space can be saved maximally, and the noise generated as a result of collision of the lead of the coil and other structures can be avoided.

The connecting part 42 comprises a first connecting part 421 adhered to the bottom wall 11 and a second connecting part 422 adhered to the inner surface of the second side wall 13. The first connecting part 421 is applied to electric connection of the first conductive terminal 411 and the second conductive terminal 412, and the second connecting part 412 is formed after extension from the center of the first connecting part 421 in zigzag form and is applied to electric connection of the first connecting part 412 and the welding part 43. Therefore, the electric connection of the coil 32 can be facilitated, and the reliability of the product can be improved by using such a structure.

The vibration motor 100 further comprises limiting barrier sheets 6 fixed on the bottom 11 of the housing and the cover plate 5 respectively, wherein one pair of the limiting barrier sheets 6 are arranged on the bottom 11 of the housing and the cover plate 5 respectively, in order to limit the first vibration system 2 and the second vibration system 3 respectively. Correspondingly, a first limiting hole 2102 is arranged on the first weight 21, and a second limiting hole 310 is arranged on the second weight 31; and at least one part of the limiting barrier sheet 6 is arranged in the limiting hole, in order to limit and protect the vibration motor 100.

The beneficial effects of the present applications are as follows: the vibration motor in the present application is equipped with the platform to be turned over to the external part on the housing; the conductive terminal adhered to the bottom wall of the housing and the welding part extending onto the platform are arranged on the flexible circuit board, which facilitates electric connection of the coils; therefore, the reliability of the product can be improved.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A vibration motor, including:
    a housing having an accommodation space, and including a bottom wall and a side wall extending perpendicularly from the bottom wall, the side wall comprising two first side walls extending along the vibration direction of the first vibration system and two second side walls positioned on two ends of the first side walls and connecting with the two first side walls respectively;
    a cover plate engaging with the housing;
    a first vibration system suspended in the accommodation space and positioned close to the cover plate, the first vibration system comprising at least one permanent magnet;
    a second vibration system suspended in the accommodation space and opposed to the first vibration system, the second vibration system positioned on one side close to the bottom wall of the housing, the second vibration system comprising at least one coil; wherein
    the housing further comprises a platform extending out from the second side wall to outside of the housing, the platform and the cover plate are arranged opposed to each other; and wherein
    the vibration motor further comprises a flexible circuit board connecting with the coil electrically; and the flexible circuit board comprises a conductive terminal positioned to the bottom wall, a welding part fixed to the platform and a connecting part connecting the conductive terminal with the welding part.

2. The vibration motor as described in claim 1, wherein the second vibration system comprises a first coil and a second coil arranged abreast along the vibration direction; the conductive terminal comprises a first conductive terminal connected with the first coil electrically and a second conductive terminal connected with the second coil electrically; and the first conductive terminal and the said second conductive terminal are respectively fixed to two sides of the bottom wall and propped against two first side walls.

3. The vibration motor as described in claim 2, wherein the connecting part comprises a first connecting part fixed to the bottom wall and connecting the first conductive terminal and the second conductive terminal, and a second connecting part extending from a middle part of the first connecting part to the welding part.

4. The vibration motor as described in claim 3, wherein the second connecting part is fixed to an inner surface of the second side wall.

5. The vibration motor as described in claim 4, wherein the first vibration system comprises a first weight equipped with an accommodation hole for accommodating the permanent magnet; the accommodation hole penetrating the first weight along a direction vertical to the vibration direction of the first vibration system.

6. The vibration motor as described in claim 5, wherein the second vibration system comprises a second weight equipped with an accommodation groove for accommodating the coil; the accommodation groove extending along a direction perpendicularly to the vibration direction.

7. The vibration motor as described in claim 6, wherein the first vibration system comprises a first elastic support having one end fixed on the housing and another end fixed on the first weight; the second vibration system comprises a second elastic support having one end fixed on the housing and another end fixed on the second weight.

8. The vibration motor as described in claim 7, wherein a first pole plate attached to the first weight is arranged on the first vibration system.

9. The vibration motor as described in claim 8, wherein a second pole plate attached to the second weight is arranged on the second vibration system.

* * * * *